United States Patent [19]

Berti

[11] Patent Number: 4,553,181
[45] Date of Patent: Nov. 12, 1985

[54] DISK DRIVE POSITIONING SYSTEM PROVIDING FAULT-FREE PROTECTION AGAINST ENDSTOP HEAD CRASHES BY USE OF A PASSIVE NETWORK IN THE ACTUATOR DRIVING SIGNAL PATH

[75] Inventor: Eugenio Berti, San Jose, Calif.

[73] Assignee: Memorex Corporation, Santa Clara, Calif.

[21] Appl. No.: 512,873

[22] Filed: Jul. 12, 1983

[51] Int. Cl.[4] .......................... G11B 21/02; G05G 5/00
[52] U.S. Cl. .......................................... 360/75; 360/77;
    360/78; 318/626
[58] Field of Search ...................... 360/75, 77, 78, 105;
    318/561, 563, 626, 621, 466, 468, 469; 333/17
    R, 17 L, 17 M, 20, 172

[56] References Cited

U.S. PATENT DOCUMENTS

| | | | |
|---|---|---|---|
| 2,917,694 | 12/1959 | Ashcraft | 333/19 X |
| 3,795,853 | 3/1974 | Whitehouse | 318/626 X |
| 3,936,876 | 2/1976 | Taylor | 360/78 |
| 4,321,517 | 3/1982 | Touchton et al. | 360/78 X |
| 4,375,611 | 3/1983 | Greig | 318/626 |

Primary Examiner—Raymond F. Cardillo, Jr.
Assistant Examiner—Steven R. Garland
Attorney, Agent, or Firm—Nathan Cass; Kevin R. Peterson; David W. Heid

[57] ABSTRACT

Damaging head crashes are prevented in a disk drive system by providing a specially chosen RC network between the head position control servo and the head actuator. The values of the RC network are chosen in conjunction with the servo output voltage so that, without detracting from head access time, the maximum head velocity will be limited to a value which will prevent damaging head crashes even when a fault occurs in the system.

9 Claims, 6 Drawing Figures

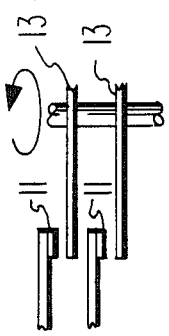
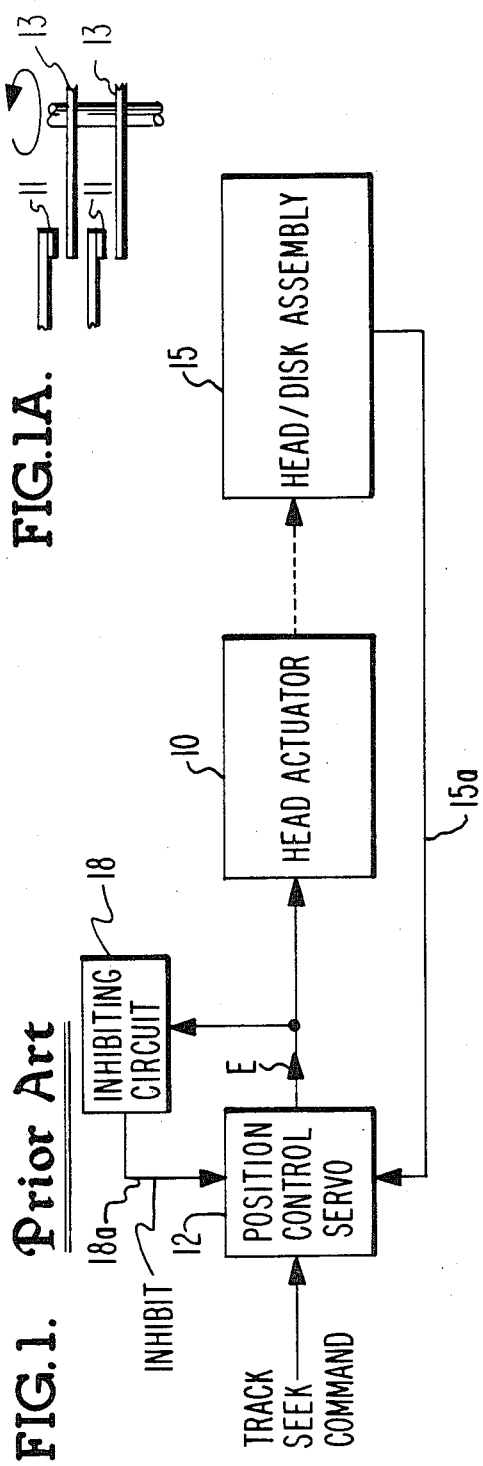
FIG.1. Prior Art FIG.1A.
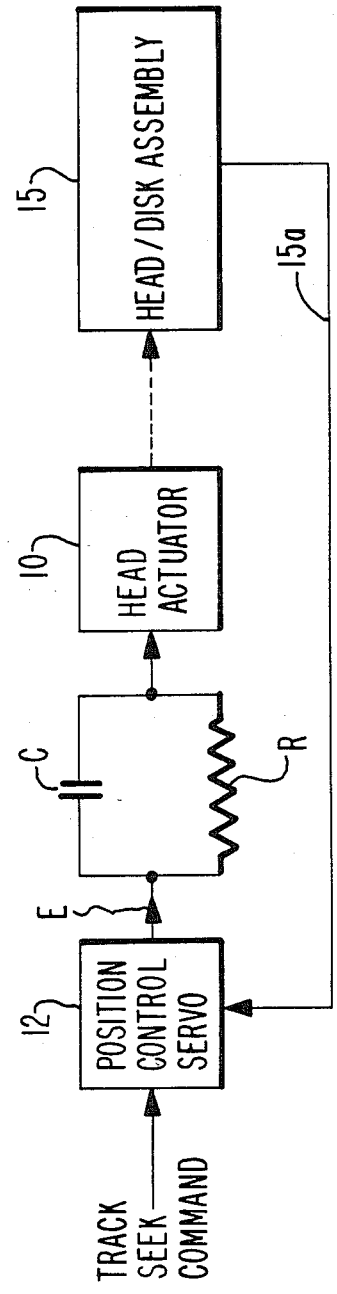
FIG.2.

DISK DRIVE POSITIONING SYSTEM PROVIDING FAULT-FREE PROTECTION AGAINST ENDSTOP HEAD CRASHES BY USE OF A PASSIVE NETWORK IN THE ACTUATOR DRIVING SIGNAL PATH

BACKGROUND OF THE INVENTION

The present invention relates to a positioning servomechanism. More particularly, the present invention relates to a positioning servomechanism operating between endstops, where a high speed collision with the endstops would damage the servomechanism itself or the equipment being positioned. Still more particularly, the present invention relates to the style of servomechanism which is used to position a radially movable transducer head over data storage tracks on a disk. In greatest particularity, the present invention relates to a disk storage system employing a head positioning servomechanism where provision is made to prevent damage in the event a fault condition occurs.

The use of servomechanisms to position radially movable read/write heads over data storage tracks on disks is a well known art. The head is moved between endstops representing the least and greatest radii of its range. The read/write head is fragile, and is mounted on flimsy flexures. If the head collides violently with either of its endstop positions, it is likely to be seriously damaged. Also, the head flexures, or the servomechanism actuator itself, may also be damaged. In addition, there is usually provided a head unloading ramp, up which the head is parked when removed from the surface of the disk. Collision of the head with this ramp at high speed also places the head in extreme risk of sustaining damage.

The trend towards higher performance disk drives has resulted in the abandoning of relatively safe but slow stepping motor head positioning servomechanisms in favor of faster actuators, where a force positions the head under the control of positional feedback information and externally applied demand and control signals. Should any fault develop in the servomechanism or the equipment providing demand and control signals, then there is a risk that the actuator (and thus the head) will be accelerated uncontrollably towards one or other of its endstops, thereby destroying the head. Because of the relatively high cost of heads, such destruction can be very costly. Also, the replacement of a head is a delicate and time-consuming operation.

One approach to the solution of the above described problem is disclosed in U.S. Pat. No. 4,375,611. In this approach, an inhibiting circuit is provided for monitoring the servo output voltage applied to the head actuator. The inhibiting circuit operates to disconnect the servo output from the actuator if it detects that the servo output voltage remains at a predetermined maximum value for a time sufficient to cause the head to reach a velocity which would damage the head if it impacts with an endstop. The difficulty with this solution to the head damage problem is that the inhibiting circuit, which employs active elements such as transistors, is itself subject to fault. As a result, although the number of damaging head crashes which occur is reduced by the use of such an inhibiting circuit, the number of damaging head crashes which still occur is undesirably high, particularly in view of the high cost of a head and the operating time which is lost until the head can be replaced.

SUMMARY OF THE INVENTION

It is accordingly a primary object of the present invention to provide a simple and reliable way of preventing the occurrence of damaging head crashes in a disk drive positioning system without deleteriously affecting the track-to-track head access time or track following operations.

In a preferred embodiment of the invention, this object is accomplished in an unexpectedly simple manner by inserting an appropriately chosen RC (resistance-capacitance) network between the head positioning control servo and the head actuator. The RC network is chosen in conjunction with the maximum output voltage of the positioning servo, the desired track-to-track access time, and the requirements of the track following operation so that even if the servo output voltage were to rise to its maximum value and remain there, the RC network would limit the amount of energy which would be applied to the head actuator so that the head would never acquire sufficient velocity to be damaged in the event that it impacts with an endstop.

The specific nature of the invention as well as other objects, advantages, features and uses thereof will become apparent from the following description of a preferred embodiment taken in conjunction with the appended drawings.

BRIEF DESCRIPTION OF THE DRAWINGS

FIG. 1 is a block and schematic diagram illustrating how head positioning control is conventionally provided in a disk drive system.

FIG. 1A is a block and schematic diagram illustrating how heads and disks may typically be provided for the head/disk assembly of FIG. 1.

FIG. 2 is a block and schematic diagram illustrating how head positioning control is provided in accordance with the invention.

DETAILED DESCRIPTION OF A PREFERRED EMBODIMENT

Figure 3:
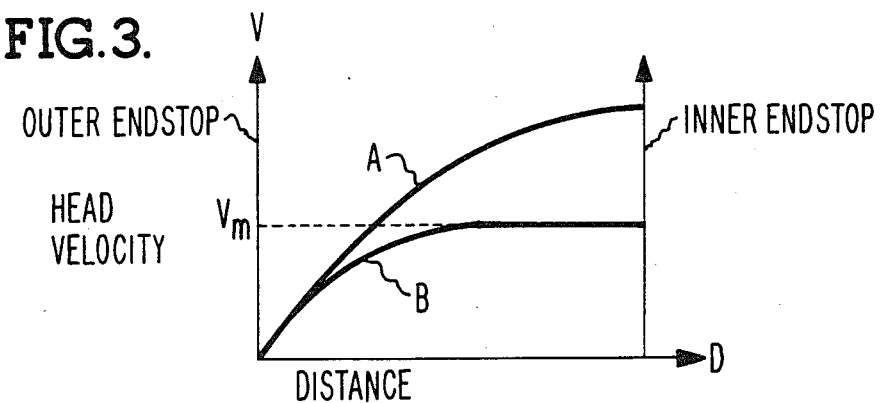
FIGS. 3–5 are graphs which are used in explaining the operation of FIG. 2.

Like numerals and characters refer to like elements throughout the figures of the drawings.

Referring initially to FIGS. 1 and 1A, illustrated therein is an overall diagram illustrating how head positioning control is conventionally provided in a disk drive system. As shown, a head actuator 10, in response to an output voltage E from a position control servo 12, provides for controlled radial movement of one or more heads 11 with respect to one or more associated rotating magnetic disks 13 contained in a head/disk assembly 15. The head actuator 10 is of the well known voice coil type which produces an output displacement force which is proportional to the current flowing in its movable coil assembly. The head/disk assembly 15 provides a position signal 15a indicative of radial head position which is fed back to the position control servo 12 for use in conjunction with a track seek command for moving the head to a specified track. The position control servo also conventionally includes track following circuitry which operates to cause a head to precisely follow a specified track after it has been moved to the track in response to a track seek command.

Endstops are typically provided in the head/disk assembly for restricting head movement to a predetermined range of radii. During normal operation, the head may impact these endstops, but head velocity is controlled so that no damage occurs. However, if a fault should occur in the position control servo 12, its output voltage E could rise to an elevated level for a time which will cause the head to strike the endstop with a sufficiently high velocity so as to damage the head. The approach for solving this problem disclosed in the aforementioned U.S. Pat. No. 4,375,611 which involves the use of an inhibiting circuit 18 is also shown in FIG. 1. This inhibiting circuit 18 operates to provide an inhibiting signal 18a to the position control servo 12 if it detects that the servo output voltage E remains at a predetermined maximum value for a time sufficient to cause the head to reach a velocity which would damage the head if it impacts with an endstop. As pointed out previously, the use of such an inhibiting circuit 18, which employs active elements such as transistors, is itself subject to fault and therefore may still permit an undesirable number of damaging head crashes to occur.

Reference is now directed to FIG. 2 which illustrates a preferred embodiment of the present invention. As will be seen, the embodiment of FIG. 2 differs from that of FIG. 1 in that the protective inhibiting circuit 18 is omitted and instead an RC network, comprised of a capacitor C and a resistor R in parallel, is inserted between the position control servo 12 and the head actuator 10.

It was most surprising to discover that the use of this simple, passive RC network as shown in FIG. 2 could by itself provide substantially complete protection against damaging head crashes without detracting from system performance. Of particular concern in this regard was the track-to-track access time.

An analysis of the performance of a system such as illustrated in FIG. 2 was made using the applicable differential equations and it was determined both mathematically and experimentally that an appropriately chosen RC network would indeed provide substantially complete protection against damaging crashes without deleteriously interfering with track-to-track access time or track-following performance. Some insights into the basis for this conclusion can be gained by reference to the graphs of FIGS. 3-5.

FIG. 3 is a plot of head velocity V vs. distance D showing the velocity acquired by a head as it moves across a disk diameter between its inner and outer endstops in response to the maximum servo output voltage E. Curve A in FIG. 3 illustrates the head velocity for the circuitry of FIG. 2 without an RC network, while curve B illustrates the head velocity with an appropriate RC network. It will be seen that for curve B the head velocity does not exceed a predetermined maximum velocity $V_m$ (which is the maximum velocity that the head should be permitted to reach in order to prevent damage when the head impacts with the endstop), while for curve A the head velocity continually increases and impacts the endstop at a high velocity which can be expected to damage the head.

Figure 4:
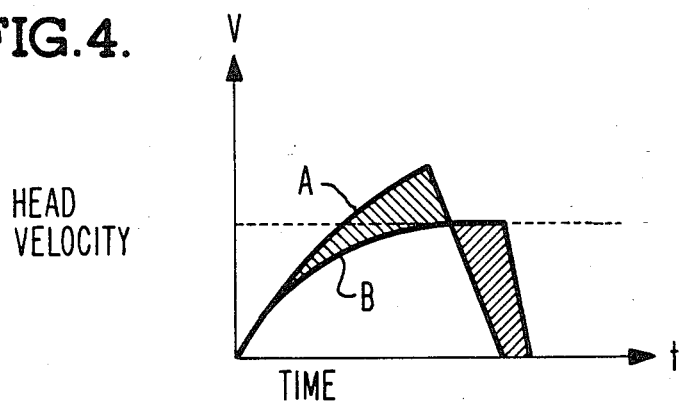

Although the use of the RC network limits the head velocity to a safe value, such use would be expected to have the disadvantage of producing an undesirable increase in track-to-track access time so as to make such an approach unacceptable. This will be understood from the graph of FIG. 4, which is a plot of head velocity V vs. time t. Waveform A in FIG. 4 illustrates a typical velocity vs. time waveform provided by the position control servo 12 (FIG. 1) for moving a head from an existing track to a new track in an efficient manner. As is well known, this driving waveform provided by the position control servo 12 is specially chosen based on the track distance over which the head is to be moved so that the head is rapidly accelerated for a predetermined time after which the acceleration is removed so that the head coasts to the desired track with a minimum of overshoot. If an RC network were added as shown in FIG. 2 (without any other change) in order to limit the maximum head velocity, the resulting waveform would be of the type illustrated by waveform B in FIG. 4. Since the area under the two waveforms should be equal in order to move the head the same distance, it will be apparent from the cross-hatched areas in FIG. 4 that waveform B will require a greater amount of time than will waveform A to move the head the same distance, thereby increasing the track-to-track head access time.

Figure 5:
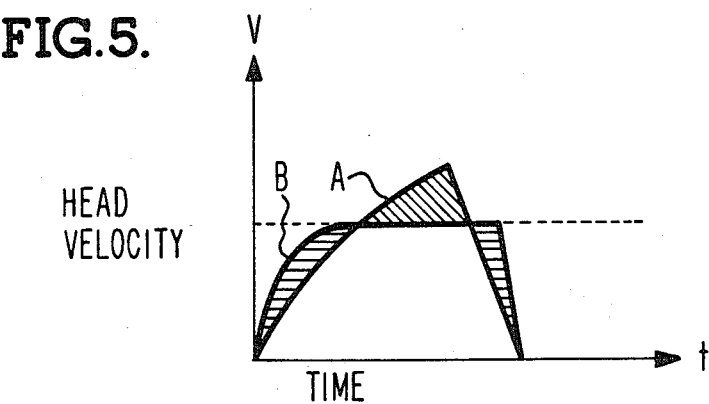

The graph in FIG. 5 illustrates how a given access time can be achieved in accordance with the present invention even when using the RC network. As in FIG. 4, waveform A illustrates a conventional waveform for moving a head from an existing track to a new track, while waveform B is the waveform obtained with an R-C network inserted as shown in FIG. 2. However, an important difference between the B waveforms in FIGS. 4 and 5 is that waveform B of FIG. 5 is obtained using a sufficiently higher servo output voltage E so that the decreased rise and decay times obtained compensate for the higher velocity permitted by waveform A, as indicated by the cross-hatched areas in FIG. 5. In this regard, it is to be noted that the presence of the capacitor C is advantageous during the deceleration period when the servo output voltage E is turned off, since the charged voltage on the capacitor C provides a reverse voltage to the head actuator 10 which causes a faster head deceleration than would otherwise be obtained. It is also to be noted that the capacitor C will be discharged during the track following mode which takes over after the head reaches the desired track during a seek operation. Thus, the capacitor C will always begin charging from the same initial voltage at the start of a seek operation, thereby assuring the repeatability of the waveforms obtained during a seek operation where the RC network is employed.

Next to be considered is the manner in which the values of the resistance R and capacitance C of the RC network in FIG. 2 and the maximum servo output voltage E are chosen for a given system so as to limit the head velocity to a predetermined maximum value (sufficient to prevent damaging head crashes), while providing a desired access time. By way of example, the particular disk drive system which will be considered for exemplary purposes is the commercially available Memorex 3652 disk drive system.

The value of the resistance R of the RC network is primarily determined by the characteristics of the track following circuitry conventionally provided in the position control servo 12. It has been found that a certain minimum resistance is required between the position control servo 12 and the head actuator 10 in order to provide reliable track following. For the Memorex 3652, this resistance value is approximately 100 ohms. Using this resistance value, measurements were made on the Memorex 3652 for different values of the capacitance C and the servo output voltage E. It was determined that a capacitance value of approximately 1200 microfarads along with a maximum servo output voltage E of approximately 46 volts would limit the maximum head velocity to about 55 ips (which is adequate to prevent damaging head crashes), while maintaining the head access time at a desired value.

As a final point, it is important to recognize that the use of the RC network as shown in FIG. 2 is a highly reliable way of limiting head velocity in order to prevent damaging head crashes since the resistor R and capacitor C are passive elements which have a very low failure rate.

It is to be understood that the present invention is not limited to the particular form of the invention disclosed herein. For example, the RC network shown in FIG. 2 can be provided in various equivalent ways using appropriate combinations of passive elements.

The present invention is accordingly to be considered as including all possible modifications and variations coming within the scope of the appended claims.

What is claimed is:

1. In a disk drive system, the combination comprising:
   a head/disk assembly including a rotatable disk and a radially movable head cooperating therewith;
   said head/disk assembly providing a position signal indicative of the radial position of said head;
   a head actuator for radially positioning said head relative to said disk in response to applied electrical energy;
   a position control servo responsive to said position signal for producing a servo output signal;
   a passive network interposed between said position control servo and said head actuator such that said servo output signal causes electrical energy to be applied to said actuator via said network, said servo output signal having a maximum amplitude which in the absence of said network would cause said head to reach a velocity which could result in a damaging crash of said head;
   said passive network being chosen in conjunction with said servo output signal so that, even if said servo signal rises to its maximum value and remains there, said network will limit the energy applied to said actuator to prevent said head from reaching a velocity which could result in a damaging crash of said head.

2. The invention in accordance with claim 1, wherein said position control servo is also responsive to an applied seek command for controlling said acutator to move the head to a commanded track.

3. The invention in accordance with claim 2, wherein said network is chosen to operate in response to a servo output signal produced by said position control servo in response to said applied seek command to cause energy to initially be applied to said actuator at a rate approximating that which would be applied if said network were absent.

4. The invention in accordance with claim 3, wherein said network is chosen to operate in response to the removal of said servo output signal to cause a faster deceleration of said head than if said network were absent.

5. The invention in accordance with claim 2, wherein said network is chosen in conjunction with said servo output signal so that the energy applied to said actuator in response to a seek command is approximately the same as would be applied thereto in a system designed assuming said network is absent.

6. The invention in accordance with claim 1, wherein said passive network comprises resistance and capacitance components.

7. The invention in accordance with claim 6, wherein said passive network comprises a resistance and capacitance in parallel.

8. The invention in accordance with claim 7, wherein said capacitance is discharged to a predetermined value during the track following operation of said servo so as to thereby provide a constant initial voltage for said capacitance when a seek command is applied.

9. The invention in accordance with claim 7, wherein said resistance has a value chosen to provide for track following operation of said servo.

* * * * *